No. 856,833. PATENTED JUNE 11, 1907.
A. ARTER.
HAY LOADER.
APPLICATION FILED OCT. 1, 1906.
2 SHEETS—SHEET 1.
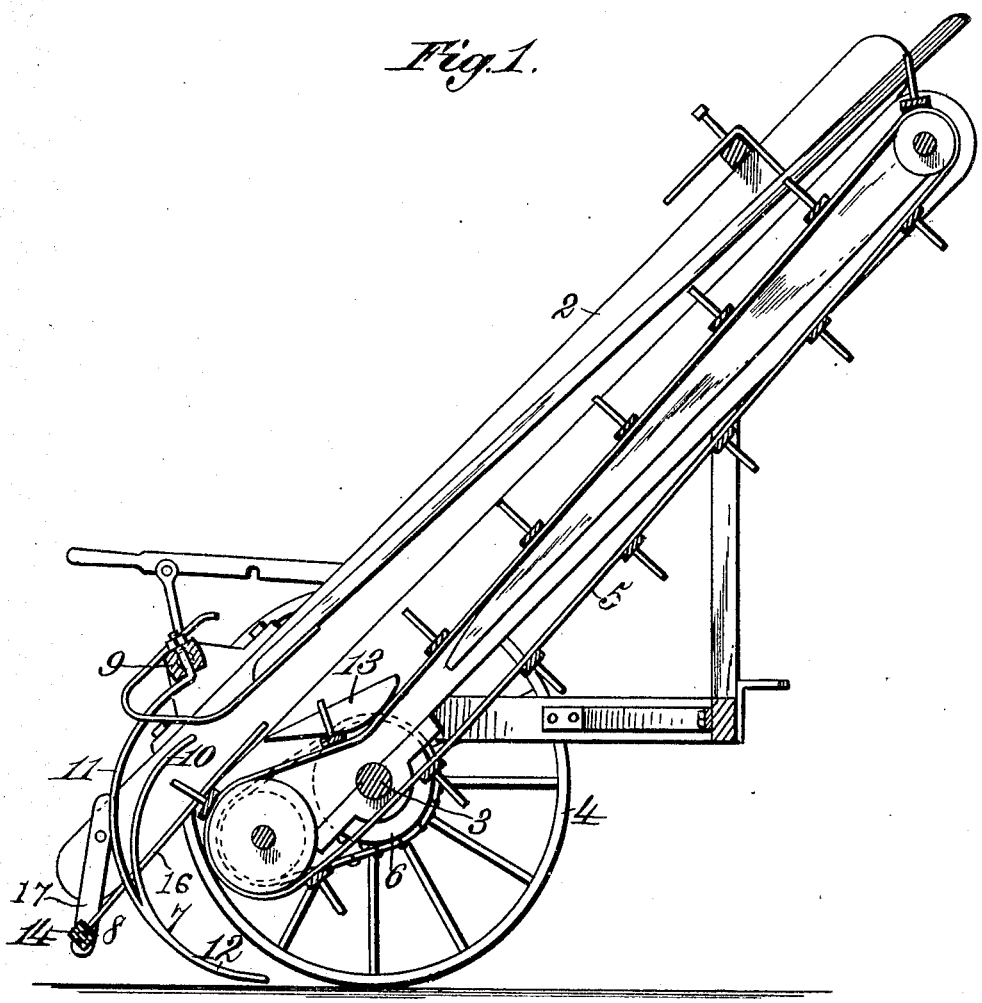
Fig.1.
Witnesses,
Inventor:
Alpheus Arter,
By
James L. Norris,
Atty.

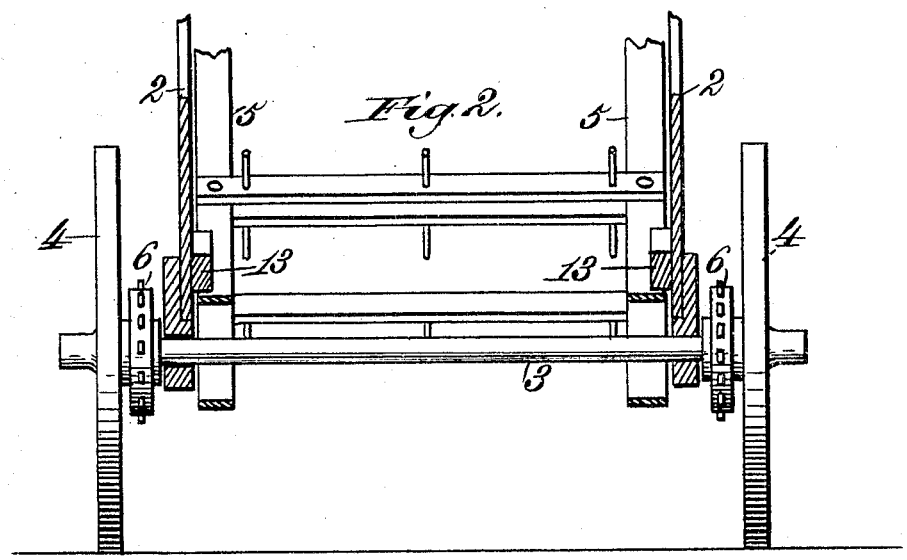
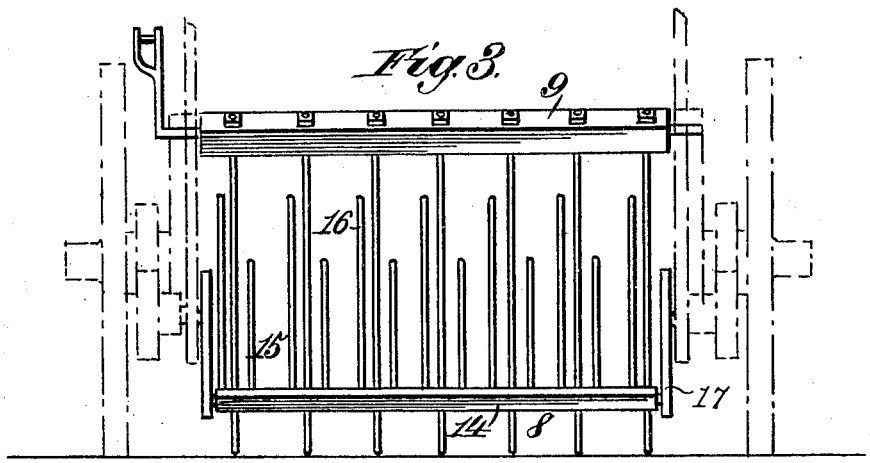
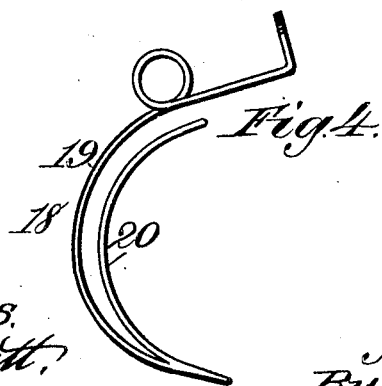

# UNITED STATES PATENT OFFICE.

ALPHEUS ARTER, OF LISBON, OHIO.

HAY-LOADER.

No. 856,833.  Specification of Letters Patent.  Patented June 11, 1907.

Application filed October 1, 1906. Serial No. 337,006.

*To all whom it may concern:*

Be it known that I, ALPHEUS ARTER, a citizen of the United States, residing at Lisbon, in the county of Columbiana and State of Ohio, have invented new and useful Improvements in Hay-Loaders, of which the following is a specification.

This invention relates to hay loaders.

While I do not limit myself to the incorporation of my invention in a hay loader of any particular character or type, the same is of especial utility, however, when employed in conjunction with a hay loader of the same general form as that disclosed in Letters-Patent No. 795,186, of July 18, 1905, granted to me and John D. Baker, and to which reference may be had.

In the drawings accompanying and forming a part of this specification, I represent in detail one form of embodiment of my invention which to enable those skilled in the art to practice said invention will be fully set forth in the following description, while the novelty of the invention will be included in the claims succeeding said description.

Referring to said drawings, Figure 1 is a vertical sectional view of a hay loader involving my invention. Fig. 2 is a transverse sectional view of the loader. Fig. 3 is a detail view of the rake mechanism showing certain of the structure of the loader in dotted lines. Fig. 4 is a detail view of a modified form of rake tooth hereinafter more particularly described.

Like characters indicate corresponding parts throughout the several views.

The different parts of the device may be supported by any suitable framework. The framework employed in the present instance is of the same nature as that disclosed by the Letters-Patent hereinbefore referred to and includes in its construction two side members as 2 which may be conveniently made from wood, although the kind of material from which the said two side members is constructed is immaterial. The axle of the machine is denoted by 3 and is provided at its opposite ends with traction wheels as 4. Supported between the side members or boards 2 is an endless carrier or elevator as 5. When the loader is in operation the side members 2 and the carrier 5 between the same are disposed angularly so that when what might be considered the outer run of the carrier is moved upward, such carrier can elevate the hay from near the ground into a wagon or the like. I do not deem it necessary to go into detail of the construction of the carrier, for the same may be like, or substantially like, the corresponding part fully described in the Letters-Patent aforesaid. This carrier 5 is driven from and by the wheels 4 and between the two parts I may dispose sprocket gearing as 6 for such purpose. The loader includes in its construction a loading rake as that denoted in a general way by 7 and a clearing rake as that denoted in a general way by 8. The teeth of the loading rake are adapted to traverse or run adjacent to the ground over which the loader travels for the purpose of lifting up hay thereon and for delivering the same to the carrier 5.

The loading rake 7 consists of a head 9 provided with a plurality of arched teeth 10. This head 9 is supported for oscillation by suitable bearings upon the side boards 2 and the teeth 10 may be connected with said head in any desirable way. Each of the teeth 10 consists of a body as 11 and a working portion as 12. The bodies 11 are directly united with the head 9 while the working portions 12 are connected with the lower ends of the respective bodies. The working portions 12 are of continuous curvature and not only are their outer ends free of the head 9, but their inner ends are. The outer ends of these working portions 12 engage the hay which during the forward motion of the loader is caused to traverse the working portions 12 and to leave the same at the upper free ends thereof and to fall from said free ends onto the lower end of the carrier 5. The working portions 12, therefore, are free or separate from the head 9 so that the hay cannot encounter or become entangled with the head 9.

In connection with the endless carrier or elevator 5 I provide pressure means which may be of any desirable character and which act against the lower portion of the outer run thereof to hold said lower portion at a downward and outward angle with respect to the upper portion of said outer run, so as to provide an effective lodgment for the hay and prevent the same from slipping backward off said carrier. The pressure means is represented as consisting of two shoes as 13 carried suitably by the inner faces of the two side boards 2 and directly opposite each other. These two shoes bear against the upper or outer run of the carrier 5 for the purpose set forth.

The clearing rake 8 is represented as composed of a head 14, short teeth 15 and long teeth 16, the said teeth being arranged in alternation and extending through the spaces between the rake teeth 10. The head 14 is supported for automatic oscillation by hangers as 17 sustained by the said side boards 2, by reason of which it may yield in case of inequalities or obstructions in the mass of hay under the action of the apparatus. The long teeth 16 overlie the lower portion of the carrier thereby to guide the hay properly on the carrier, and to also prevent hay being crowded on to said carrier, while the short and long teeth combine to prevent such hay choking or clogging in the spaces between the teeth 10.

The foregoing construction is set forth fully in Figs. 1 to 3.

In Fig. 4 I show a modified form of a loading rake tooth, the same being designated in a general way by 18 and consisting of a body as 19 and a working portion as 20. The body 19 is united directly with the head of the modified form of rake which head may be one like the head 9 hereinbefore described. The body 19 and working portion 20, both of which are curved, may be of substantially the same length and the two parts diverge toward the head so that the upper or inner end of the working portion 20 will be separated from the rake head. The rake teeth may, of course, be made in other ways and the same statement applies to other features of the invention.

What I claim is:

1. In a hay loader, an endless carrier inclined forward and upward, two convex shoes supported at opposite sides of said endless carrier, stationary relatively thereto, and the convex faces of which bear against the lower portion and opposite sides only of the outer run of said carrier to hold said lower portion at an outward and downward angle with respect to the upper portion thereof, and a hay rake to deliver material on to the carrier below the place at which said shoes act thereagainst.

2. In a hay loader, a pair of side frame members inclined forward and upward, an endless carrier supported between said side frame members, stationary shoes carried by the respective side frame members and bearing against the lower portion and opposite sides only of the outer run of said endless carrier at opposite sides thereof to hold said lower portion at an outward and downward angle with respect to the upper portion thereof, a hay rake to deliver material on to the carrier below said shoes, and a clearing rake coöperative with the hay rake and also with said endless carrier.

3. In a hay loader, a pair of side boards inclined forward and upward, an endless carrier supported between said side boards, stationary shoes carried by the side boards near the lower ends and between the sides thereof, said shoes being convexed and their convexed faces bearing against the endless carrier at opposite sides only of said carrier near the lower end thereof to hold the lower portion of said carrier at an outward and downward angle with respect to the upper portion thereof, and a hay rake to deliver material on to the carrier below the shoes.

In testimony whereof I have hereunto set my hand in presence of two subscribing witnesses.

ALPHEUS ARTER.

Witnesses:
JAMES G. MOORE,
JAS. R. SEAGRAVE.